March 19, 1940.    H. W. DUDLEY    2,194,298
SYSTEM FOR THE ARTIFICIAL PRODUCTION OF VOCAL OR OTHER SOUNDS
Filed Dec. 23, 1937    9 Sheets-Sheet 2

INVENTOR
H. W. DUDLEY
BY
B. H. Jackson
ATTORNEY

March 19, 1940. H. W. DUDLEY 2,194,298
SYSTEM FOR THE ARTIFICIAL PRODUCTION OF VOCAL OR OTHER SOUNDS
Filed Dec. 23, 1937. 9 Sheets-Sheet 3

INVENTOR
H. W. DUDLEY
BY
B. H. Jackson
ATTORNEY

FIG. 23
e = well

FIG. 28
a = tall

FIG. 24
a = fat

FIG. 29
a = father

FIG. 25
μ = cool

FIG. 30
μ = fur

FIG. 26
o = book

FIG. 31
μ = up

FIG. 27
o = omit

March 19, 1940.     H. W. DUDLEY     2,194,298
SYSTEM FOR THE ARTIFICIAL PRODUCTION OF VOCAL OR OTHER SOUNDS
Filed Dec. 23, 1937     9 Sheets-Sheet 5

INVENTOR
H. W. DUDLEY
BY
ATTORNEY

March 19, 1940. H. W. DUDLEY 2,194,298
SYSTEM FOR THE ARTIFICIAL PRODUCTION OF VOCAL OR OTHER SOUNDS
Filed Dec. 23, 1937 9 Sheets-Sheet 6

FIG. 33

INVENTOR
H. W. DUDLEY
BY
ATTORNEY

March 19, 1940.    H. W. DUDLEY    2,194,298

SYSTEM FOR THE ARTIFICIAL PRODUCTION OF VOCAL OR OTHER SOUNDS

Filed Dec. 23, 1937    9 Sheets-Sheet 7

INVENTOR
H. W. DUDLEY
BY
ATTORNEY

Patented Mar. 19, 1940

2,194,298

UNITED STATES PATENT OFFICE 2,194,298

SYSTEM FOR THE ARTIFICIAL PRODUCTION OF VOCAL OR OTHER SOUNDS

Homer W. Dudley, Garden City, N. Y., assignor to Bell Telephone Laboratories, Incorporated, New York, N. Y., a corporation of New York Application December 23, 1937, Serial No. 181,275

18 Claims. (Cl. 179—1)

This invention relates to the artificial production of vocal or other sounds.

One of the objects of the present invention is to provide an arrangement for the synthetic production of speech or similar sounds and particularly to provide an arrangement of this type in which the desired vocal or other sounds may be produced by manual operation quite independent of any vocal control by the normal vocal mechanism of the human body.

My prior application Serial No. 47,393, filed October 30, 1935, discloses a speech communication system in which at a transmitting station an analyzer is employed to determine the fundamental frequency of a speech signal and the average power in properly chosen sub-bands of frequency, and this information is transmitted as control currents to a synthesizer at a receiving station to fashion waves from a local multi-frequency source into a simulation of the original signal. In order to produce at the synthesizer a simulation of the signal from the waves supplied from the local source, frequency sub-bands of these locally derived waves are selected which are, respectively, coextensive with the chosen sub-bands of the speech signal and the average power in each sub-band of the locally supplied waves is varied in accordance with the power in the corresponding chosen sub-band of the signal. This variation is effected in response to the information transmitted from the sending end of the system regarding the average power in the chosen sub-bands of the signal.

Two types of frequency spectrum are used alternately in speech, (1) a continuous spectrum in the case of hissing or unvoiced sounds, and (2) in the case of voiced sounds a discrete spectrum with a variable fundamental and with upper harmonics always present to a relatively high frequency. Hence, the local source provided at the synthesizer of my prior application, above referred to, preferably is such that the waves supplied by the local source can have either type of spectrum. The type is determined in response to the information transmitted from the sending end of the system with regard to the presence or absence of a fundamental frequency component in the speech wave and the frequency of any such fundamental frequency component. In other words, if the fundamental frequency is present the discrete spectrum is generated by the local source, and if no fundamental frequency is present a continuous spectrum is generated.

My prior application makes use of the fact that one set of parameters can be substituted for another set without any loss of definition so long as the number of independent parameters remain unchanged. Any change from this simple ideal above mentioned generally leads to a large number of required parameters, particularly when the newly selected ones are not independent. However, the number of independent variables involved in the production of speech is small. That is, the number of movable or variable elements of the vocal system that are controlled as parameters to give the desired speech production and are movable or variable substantially independently of one another by the muscles of the vocal system, is small. In other words, the number of variables or parameters that can be controlled substantially independently in speech production is small, being of the order of ten. Moreover, for each of the physical elements the minimum time in which it can go through a complete cycle of change in position is not less than one-tenth of a second. Consequently, each independent variable has a fundamental frequency of not over ten cycles per second while engaged in speech production.

Therefore, the speech defining signals produced by the analyzer and transmitted to the synthesizer of my prior application may be any signals derived from speech signals providing the derived signals give as many independent variable quantities or parameters as the number of independent variables involved in the production of speech. Furthermore, the chosen parameters need not be entirely independent provided their number be increased sufficiently to make up for their lack of independence. For example, if the original speech band be divided into a sufficient number of sub-bands the chosen parameters may be, as previously stated, merely the average amounts of power in the several sub-bands.

As will be clear from the foregoing, the system of my prior application Serial No. 47,393, includes a synthesizer which involves a source of oscillations capable of producing either a discrete frequency spectrum for voiced sounds or a continuous spectrum for hissing or unvoiced sounds. It also includes a number of control channels in which currents are received for effecting a number of controls. One of these controls performs two functions. It determines whether the oscillation source will generate a discrete spectrum or a continuous spectrum, and in the former case it determines, in addition, how the fundamental frequency of the discrete spectrum shall vary in pitch. Other channels are used to control the oscillations thus generated in accordance with the parameters which may be based, for example, upon the amounts of energy in chosen sub-bands of frequency in the voice range.

In accordance with one form of the present invention, instead of receiving the control currents of these channels from a distant station as in my prior application, these control currents are generated locally by independent manually operated devices, such as keys, to produce corresponding modulations and controlling effects upon the locally generated oscillations, thus producing speech manually. In the preferred form of the invention each key controls apparatus for producing only one speech sound so that the operation of the keys in the proper sequence will produce the desired speech.

Before discussing the character of the apparatus controlled by the keys to produce artificial speech it is desirable to list the minimum number of separate sounds required to give phonetic speech. Eleven vowels may be recognized which are given below by key-words rather than phonetic symbols, the vowel sounds being indicated by bold-faced letters:

| | |
|---|---|
| see | book |
| fill | omit |
| well | tall |
| fat | father |
| cool | fur |
| | up |

In the case of the consonants there is an important division as to whether the consonant is sustainable or is of the stop or explosive type. There are three pairs of stop consonants, as follows:

| Unvoiced | Voiced |
|---|---|
| P T K | B D G |

The sustainable consonant sounds consist of six pairs of cognate non-stop consonants and five unpaired voice sounds sometimes called semi-vowels. The paired sustainable consonant sounds are shown by the portions of the following words indicated by bold-faced letters:

| Unvoiced | Voiced |
|---|---|
| while | wile |
| fat | vat |
| thin | then |
| here | yes |
| seal | zeal |
| ash | azure |

The five semi-vowels are the consonants indicated by bold-faced type of the following words:

man lit ring

This makes a total of thirty-four different sounds composed of eleven vowels, six stop consonants and seventeen sustainable consonants. Two of these sounds may be made in other ways, namely, y of yes in which y may be made as a diphthong with the first or y part corresponding to the e sound of see of short duration; and the wh sound of while which may be made as the h sound of here followed by the w sound of wile. This reduces the sound list from thirty-four to thirty-two.

A few of the minor vowel sounds have been omitted from the above list: the first part of the vowel diphthong in wear is much like the sound of a in fat; the a sound of ask which is sometimes pronounced between the a of fat and the a of father; the o sound of dot which corresponds to a short duration of the a sound in father; the a sound in again which is not substantially different from the u sound of up; and the a sound of chaotic which is not substantially different from the e sound of well.

In addition, it may be mentioned that there are nine diphthongs as found in these words:

| | | |
|---|---|---|
| late | go | wear |
| might | out | poor |
| voice | here | oar |

Since these diphthongs are the combination of two vowels in succession it follows that they may be simulated by the successive production of the two individual vowels or special mechanism may be provided for producing these diphthongs without recourse to the apparatus producing the individual vowels.

There are a few other commonly used sounds which have not been specifically listed above. Thus, the affricate ch corresponds substantially to the stop consonant t plus the sustainable fricative sound sh, while its voiced cognate, the j sound of joke, is closely equal to the voiced stop sound of d followed by the sustainable fricative of z in azure. x as usually used is a diphthong equal to the sound of k followed by the sound of s. The c sound of care is equivalent to the k sound above listed. The sound of q is generally equal to the k sound followed by the w sound.

In one form of this invention it is proposed to produce the minimum number of thirty-two sounds by deriving the proper amplitude-frequency characteristic for each sound from either a discrete or continuous frequency spectrum as required. Thus, the artificial speech producing apparatus of this invention may comprise two energy sources, one giving a continuous frequency spectrum and the other giving a discrete frequency spectrum. One of these sources (or both if required) is connected to thirty-two separate equalizing networks, each network having an amplitude-frequency output equal to the energy distribution of one of the thirty-two sounds desired. Suitable keys or switches, one for each phonetic character, may be provided to connect to a loud-speaker these equalizers one at a time and in any desired succession, whereby artificial speech may be produced.

Instead of having each key connect one of the multi-frequency sources to the loud-speaker through a special equalizing network individual to the sound to be produced to obtain the proper energy level for each frequency required in the production of a given sound, an alternative form of the invention contemplates a phonetic keyboard by means of which the operation of each key controls the average energy level in chosen sub-bands of the speech range, the sub-bands being sufficiently great in number that their combined effect will give satisfactory artificial speech production.

Referring to the drawings,

Figs. 38, and 38—A to 38—E illustrate a potentiometer switching connection which may be employed for connecting the equalizer networks of Fig. 1 to the loud-speaker.

Figures 1, 2:
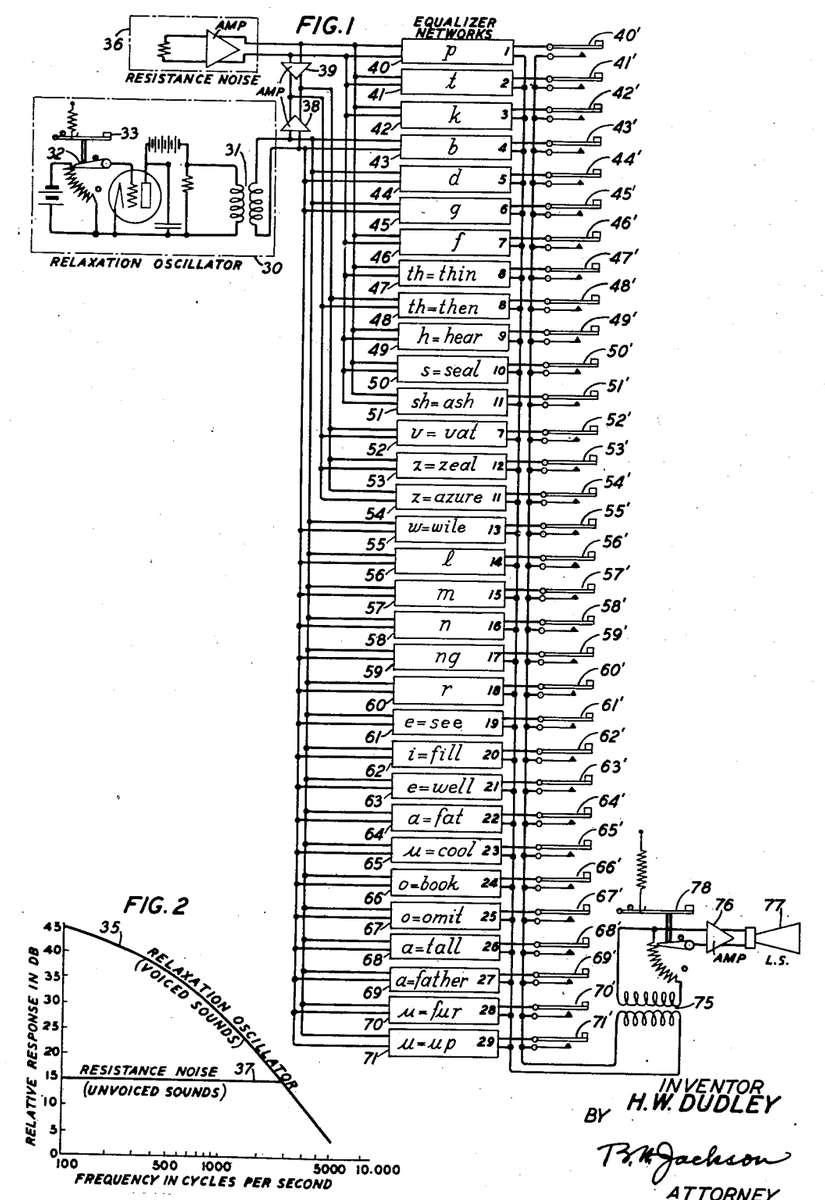
Fig. 1 represents an artificial speech producing system in which a separate equalizing network is provided for each phonetic sound to be produced.
Fig. 2 represents curves showing the amplitude-frequency characteristic of the energy sources of Fig. 1.

Before proceeding with a description of the speech producing system of Fig. 1 it will be recalled as previously stated that two different types of energy sources are needed for the artificial production of speech, one having a discrete frequency spectrum, that is, having a certain fundamental frequency and the upper harmonics thereof, but with no intermediate frequencies present; the other source having a continuous frequency spectrum, that is, one containing substantially all the frequencies present in the speech frequency range.

The discrete frequency source 30 of Fig. 1 may be similar to the multivibrator or relaxation oscillator disclosed in my earlier application, Serial No. 47,393, and its method of operation need not be described herein in detail except to state that its output supplied by transformer 31 comprises a fundamental frequency determined by the potentiometer 32, controlled by switch 33, and a large number of the upper harmonics of the fundamental frequency, but with no intermediate frequencies. Such a discrete frequency pattern source may also be of the type disclosed in the copending U. S. application to R. R. Riesz, Serial No. 100,291, filed September 11, 1936. It will be assumed herein that the amplitude-frequency output of oscillator 30 is that given by curve 35 of Fig. 2 where output in decibels on a linear scale is plotted along the vertical axis while the horizontal axis represents the frequency on a logarithmic scale.

As in my prior application, the source of a continuous frequency spectrum may be amplified resistance noise as indicated by block 36 of Fig. 1. Such a source may have an amplitude-frequency characteristic corresponding to curve 37 of Fig. 2, indicating that all frequencies lying within the speech range are present in equal amplitude.

Figure 3:
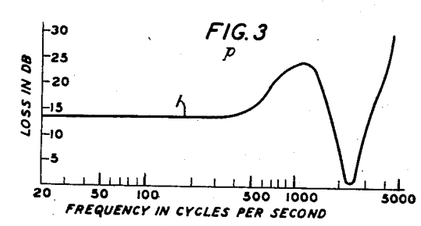
Figs. 3 to 31, inclusive, are a series of curves giving the loss characteristics of the equalizer networks of Fig. 1.
Figure 4:
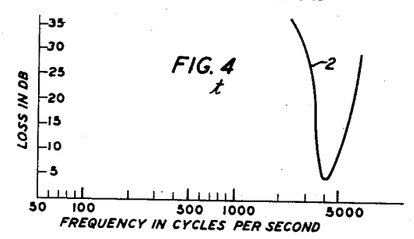
Figure 5:
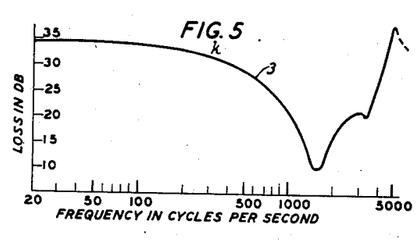
Figure 6:
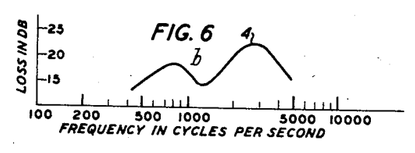
Figure 7:
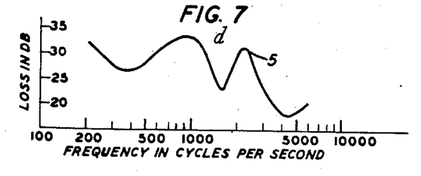
Figure 8:
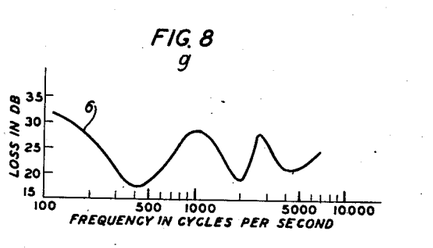

Fig. 1 shows thirty-two equalizer networks 40 to 71, inclusive, each having an amplitude-frequency characteristic indicated by one of the curves of Figs. 3 to 31, the reference number in parentheses appearing in each equalizer box being the identifying number of its characteristic curve as shown in the series of curves. Thus, the uppermost equalizer network 40 has a loss characteristic of curve 1 of Fig. 3, the next network 41 a loss characteristic in accordance with curve 2 of Fig. 4, etc. In these curves of Figs. 3 to 31 the ordinates represent transmission loss in decibels plotted on a linear scale while the abscissae represent the frequency plotted on a logarithmic scale.

Networks 40, 41, 42, 46, 47, 49, 50 and 51 are connected to receive energy from source 36 having a continuous frequency spectrum. Networks 48, 52, 53 and 54 are connected to receive energy from both sources 30 and 36 by being connected through amplifier 38 to source 30 and connected through amplifier 39 to source 36. Amplifiers 38 and 39 may be adjusted to give zero gain and are inserted to prevent the mixing of the two sources except for the specified networks. The remaining networks are connected to receive energy from source 30 which has a discrete frequency spectrum.

Each of the networks by one of the keys 40' to 71' is adapted to be connected through a transformer 75 to a suitable amplifier 76 whereby the depression of any key serves to connect either source 30 or source 36 or both to a loud-speaker 77, the amplitude-frequency characteristic of the impressed current depending upon the transmission characteristic of equalizer network interposed between the source and amplifier 76.

If the depression of any key 40' to 71' is to cause a sound to be produced to simulate a voiced or unvoiced portion of a message, it is, of course, highly important to design each network to have the proper frequency-loss characteristic to produce the energy distribution present when the desired sound is spoken. Thus, when key 40' is operated to connect network 40 between frequency source 36 and loud-speaker 77, the loud-speaker emits a sound corresponding to the consonant p; the closing of key 64' causes the loud-speaker to emit the a sound of fan by connecting network 64 between source 30 and loud-speaker 77; and the closing of key 41' causes the loud-speaker to emit the sound of t. Hence, the operation of keys 40', 64', 41' in rapid succession will given an accurate simulation of the spoken word "pat." Each equalizer network in Fig. 1 has marked thereon a symbol indicating the phonetic character of the sound produced by the loud-speaker when the particular network is connected thereto. Hence, the keys 40' to 71' may be operated in substantially the same manner as a typewriter keyboard except that in this instance the result is not printed characters but artificially produced speech. It is, of course, contemplated that the system of Fig. 1 has a properly designed network for each sound needed to produce artificial speech and although it has been assumed that satisfactory speech may be produced by the number of networks shown in the figure it will be obvious that other networks may be added if needed to produce any sounds that are not accurately simulated by the network shown.

Figure 9:
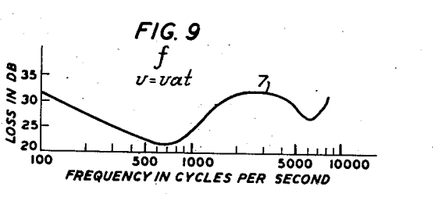
Figure 10:
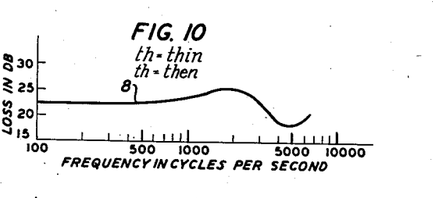
Figure 11:
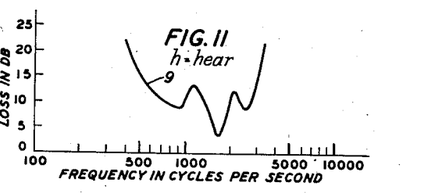
Figure 12:
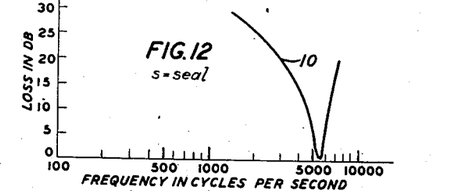
Figure 13:
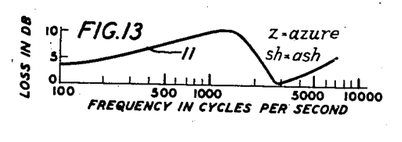
Figure 14:
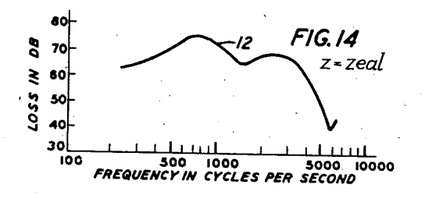
Figure 15:
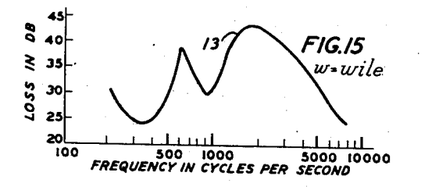
Figure 16:
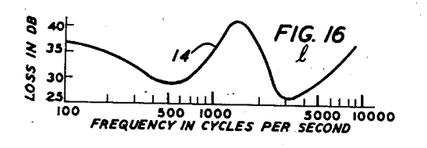
Figure 17:
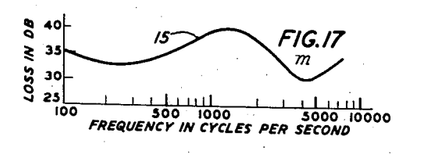
Figure 18:
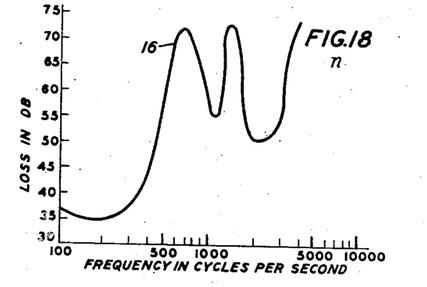
Figure 19:
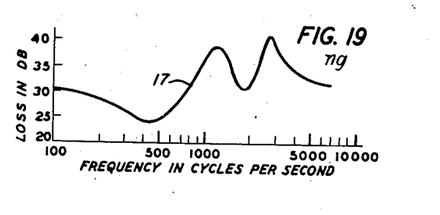
Figure 20:
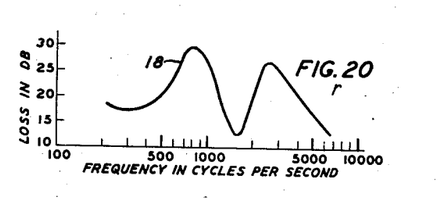
Figure 21:
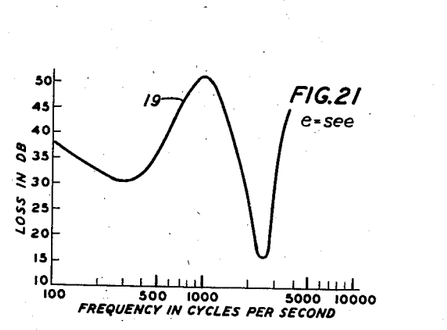
Figure 22:
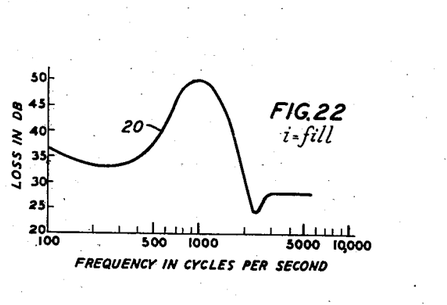
Figure 23:
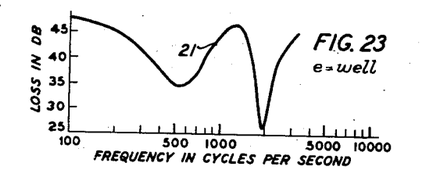
Figure 24:
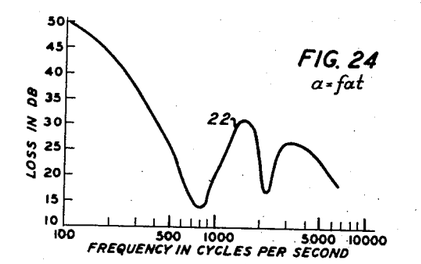
Figure 25:
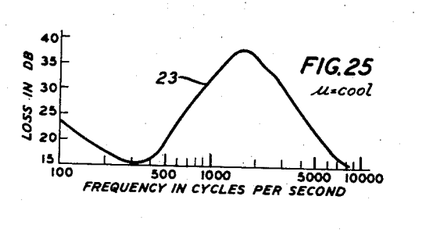
Figure 26:
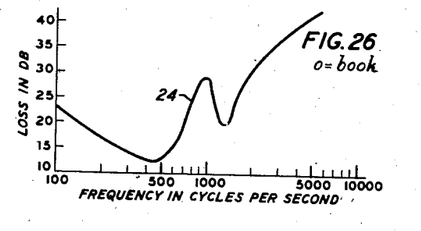
Figure 27:
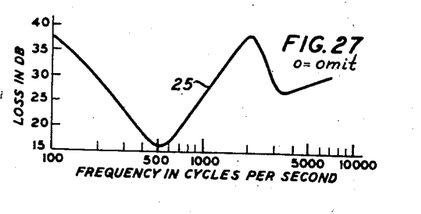
Figure 28:
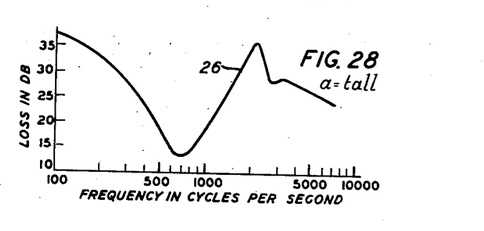
Figure 29:
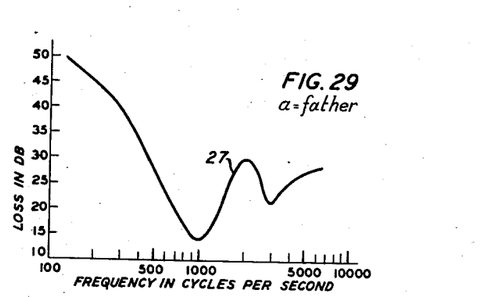
Figure 30:
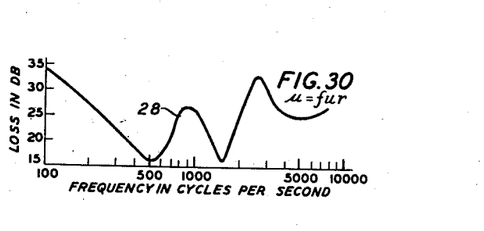
Figure 31:
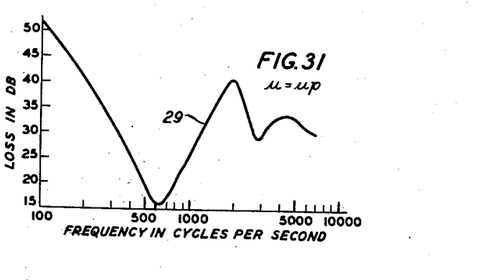

It will be noted that in Fig. 1 the same network characteristic is employed in certain instances to produce different sounds. Thus, network 46, 75 having a frequency-loss characteristic of curve 7 of Fig. 9, is used to produce the consonant sound f when connected to the continuous frequency spectrum source 36 while network 52, also having the frequency-loss characteristic of curve 7, simulates the sound of v when connected to both sources 30 and 36. Network 47, having a characteristic according to curve 8 of Fig. 10, is connected to source 36 for the sound th in thin and network 48, having the same frequency characteristic is connected to both sources 30 and 36 to give the th sound as in then. Network 51, having a transmission characteristic according to curve 11 of Fig. 13, simulates the sh sound in ash when connected to source 36, while network 54, having the same characteristic, gives the z sound in azure when connected to both sources 30 and 36. With these three explanations, each network of Fig. 1 has a different loss-frequency characteristic curve as shown by the curves of Figs. 3 to 31, the proper curve for each network being indicated by the number in parentheses on the box representing the equalizer network. When, as indicated above, it is preferred to use both sources 30 and 36 in producing artificially a given sound, it may be desirable to obtain an output from each of the two sources different in amplitude from the output obtained when the two sources are used separately. In such a case, it may be desirable to employ two equalizer networks, one for each source.

It is, of course, to be understood that the characteristic curves for the networks shown in Figs. 3 to 31 take into account the factor shown in Fig. 2, that the continuous frequency source 36 presents all frequencies to the networks at the same level, while the discrete frequency spectrum source 30 presents to the network a discrete frequency spectrum with an amplitude decreasing with frequency. That is, for example, the relative output level of each frequency at the output terminals of network 55 is not that represented by curve 13 of Fig. 15 but is represented by curve 13 as modified by curve 35 of Fig. 2. Therefore, if one wishes to secure a visual indication of the relative frequency amplitude at the output of network 55 it would be necessary to plot a new curve where the ordinate for each frequency is the sum of the ordinates for that frequency given on curves 13 and 35. The same observation applies to the other network characteristics which involve source 30 with its unequal amplitude output at the different frequencies.

The loss in each network 40 to 71, inclusive, is also adjusted in conjunction with the frequency-amplitude characteristic of each frequency source to produce all sounds as if they were being spoken at a constant level. This result is attained by the loss values of the curves shown in Figs. 3 to 31.

The thirty-two keys shown in Fig. 1 may, if desired, be arranged somewhat in the order of a typewriter keyboard in order to facilitate sufficiently rapid operation to produce artificial speech at a rate at which normal speech takes place.

As previously stated, the pitch of the fundamental frequency from source 30 may be varied at will by adjusting potentiometer 32, the switch 33 for which may be operated, for example, by the foot, in order that all fingers may be utilized in operating keys 40' to 71'. It will also be frequently desirable to increase the volume of certain sounds either for short or long periods, and this may be done by manually adjusting the gain of amplifier 76 by the operation of gain control key 78.

Figure 32:
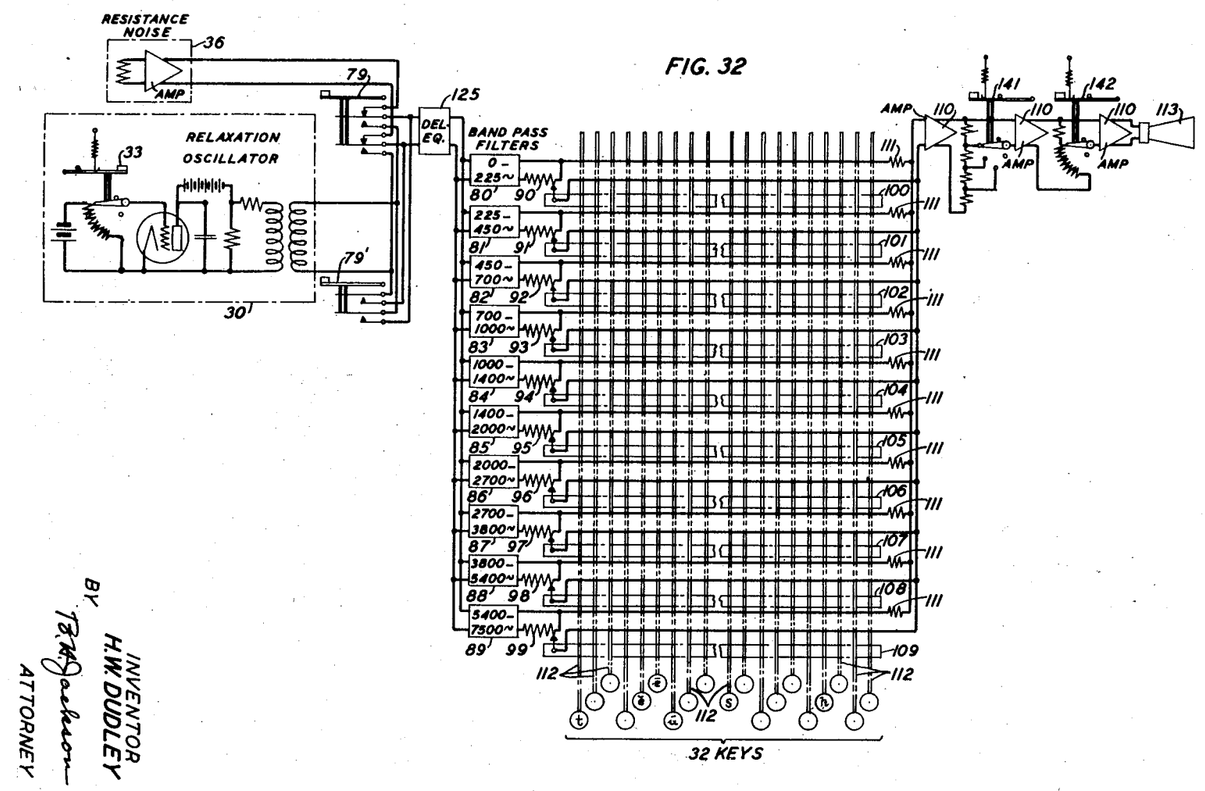
Fig. 32 is a partial view of a key-controlled speech producing system in which each key controls movable bars for assigning to each of several speech frequency sub-bands an average energy level required for the simulation of a given sound.
Figure 33:
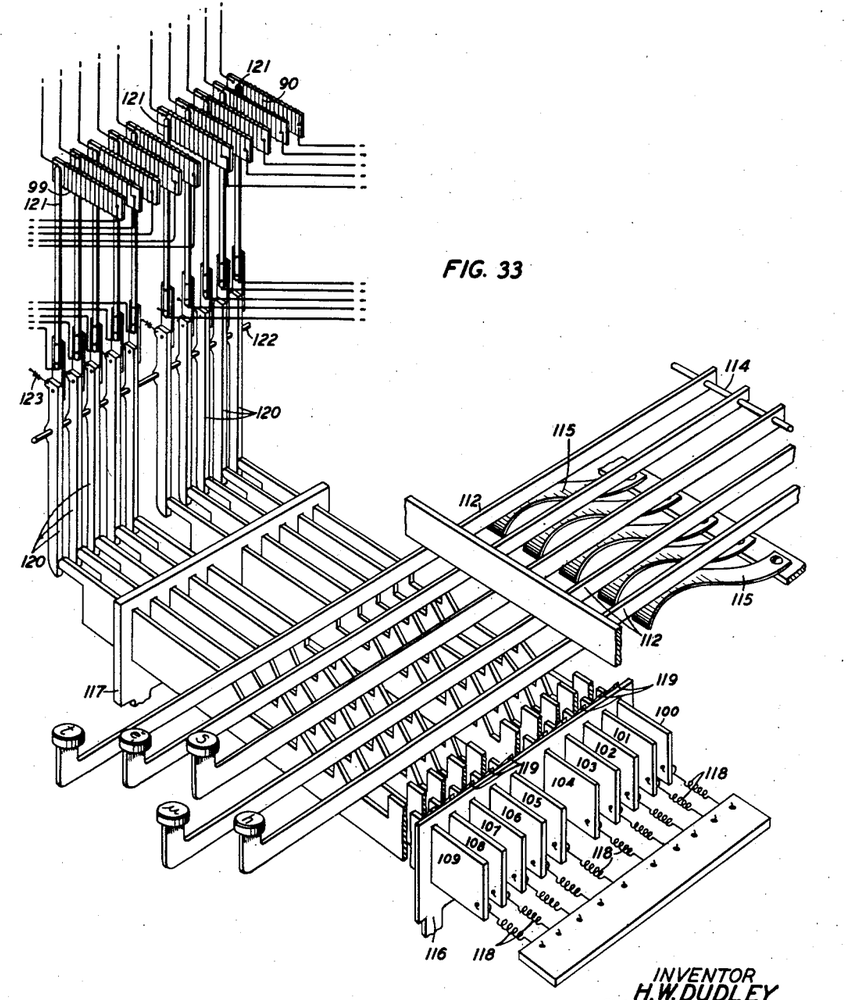
Fig. 33 is an enlarged view of the key-controlled apparatus of Fig. 32.
Figure 34:
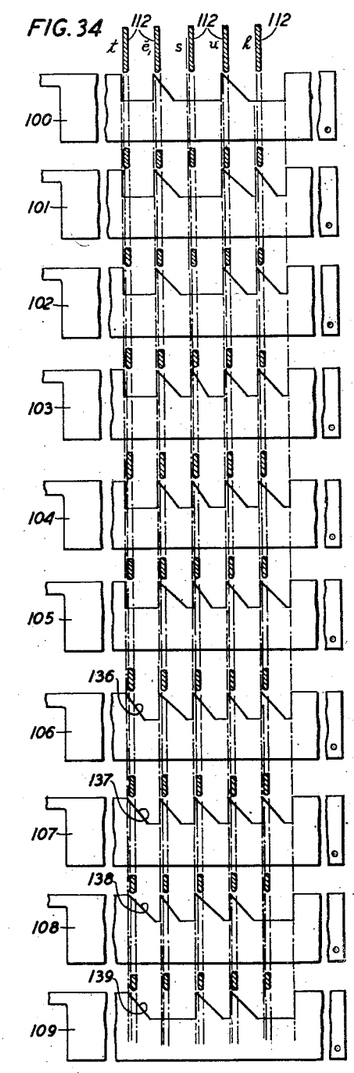
Figs. 34, 34—A and 34—B are detail views of sections of the movable bars of the apparatus of Fig. 33.

It will be apparent that the apparatus of Fig. 1 enables each frequency required in producing a given sound to be present in the proper amplitude relative to the other frequencies present. Figs. 32, 33 and 34 provide apparatus in which the speech frequency band is divided into a number of sub-bands, ten, for example, and control means are provided to give each sub-band an average energy level whereby the combined energy levels in all sub-bands when impressed upon a suitable loud-speaker will result in a satisfactory simulation of speech.

Referring first to Fig. 32, we have, as in Fig. 1, a continuous frequency spectrum source 36 and a discrete frequency spectrum source 30 with a key 79 which in its non-operated position makes source 36 effective, while in its operated position makes source 30 effective. Another key 79' is provided which when operated makes both frequency sources simultaneously effective. The output from either or both frequency sources is supplied to ten band-pass filters 80 to 89, inclusive, which are connected in parallel. The frequency band passed by each filter is shown on the drawing and collectively they include all frequencies between zero and 7500 cycles. Across the output of each filter is connected one of the potentiometer resistances 90 to 99 to supply to the input of an amplifier 110 adjustable amounts of the output level from each filter. The leads between each potentiometer and the amplifier 110 include a series resistance 111 of a few thousand ohms to prevent the output level from any one potentiometer from being affected adversely by the adjustment of any other potentiometer. Each potentiometer 90 to 99 is normally set to supply no output to amplifier 110. Ten movable bars 100 to 109, each controlling the adjustable contact of one of the potentiometers, are adapted to be moved laterally by a plurality of manually controlled keys 112, each key representing a phonetic character. The manner in which each key controls the individual movement of each of the ten bars 100 to 109 will be explained later in connection with Figs. 33 and 34. For example, when that key 112 marked s is depressed, each of the bars 100 to 109 is moved the proper amount to give such an adjustment to its potentiometer that each channel from the ten band-pass filters supplies its frequency sub-band at the proper energy level which accurately represents the average energy level in that sub-band for the sound of s when the current passed by the filters is obtained from the continuous frequency spectrum source 36. When that key 112 which is marked "ē" is depressed, the individual movement imparted to each of the bars 100 to 109 results in potentiometer settings such that the frequency sub-band passed by each filter is supplied to amplifier 110 at an energy level representing the average energy level for that sub-band in the spoken vowel e of well where the current supplied to the various filters is obtained from source 30 by actuating key 79 at the same time as the "ē" key is depressed. In a similar manner, the depression of the key marked "t" with the source 36 effective results in amplifier 110 receiving from the filters each frequency sub-band at the average energy level necessary for the simulation of the consonant sound t. Hence, the actuation of the keys s, e, t, in rapid succession with source 36 effective for s and t and source 30 effective for e, will result in loud-speaker 113 emitting sounds simulating the spoken word "set."

It is contemplated that the keyboard of Fig. 32 will comprise thirty-two keys, one for each of the phonetic symbols indicated on the equalizer networks of Fig. 1. However, other keys may be added, if desired, to secure the simulation of still other phonetic sounds needed to simulate speech. Before depressing any key 112, one must know, of course, whether either key 79 or 79' should be simultaneously actuated in order to secure current from the desired source or sources. If a continuous frequency spectrum is needed, neither key 79 nor 79' is actuated; if a discrete frequency spectrum is needed switch 79 is operated at the same time as the key on the keyboard; if both sources are desired it is necessary to operate switch 79'. Switches 79 and 79' may be foot-operated if desired. They may optionally be operated as a single three-position control by strapping switches 79' to 79 in such a way that when switch 79 is pushed some distance beyond the point at which source 30 is connected, then the contacts of switch 79' will be made. The character of the energy source needed for each phonetic symbol can be obtained from the connections established in Fig. 1.

The average energy level required in each sub-band relative to the average energy level in the other nine sub-bands can be readily determined by an examination of the curves of Figs. 3 to 31, these curves giving the frequency range of importance in the simulation of the designated sound. When any curve of this series does not extend over the entire speech range, it will be understood to indicate that any frequency sub-band of Fig. 32 into which the curve does not extend means substantially no transmission for such a sub-band. Thus, the curve of Fig. 4 for $t$ extends only between 2400 cycles and 7000 cycles, so that all potentiometers of Fig. 32 for frequencies below 2400 cycles should be set for no transmission when simulating the consonant sound $t$. There is one general exception to the above observation in that none of the equalizer curves extends below 100 cycles; but for the determination of the potentiometer setting for band-pass filter 80 it may be assumed that the transmission level for frequencies below 100 cycles is substantially at the same level as that given for a frequency of 100 cycles.

However, the average energy level for each sub-band for each phonetic sound may be readily determined experimentally by taking an oscillograph record for each sub-band of each sound and determining the respective potentiometer settings for each sound from these oscillograph records. Such oscillograph records will also have the advantage of determining the relative starting time for the energy level for each sub-band since to represent some sounds accurately the energy for certain sub-bands may be applied somewhat later than the energy from other sub-bands. The apparatus of Fig. 32, as will be described in more detail later, enables the energy level of any sub-band to be delayed in its application with respect to any other sub-band, and also enables the energy in any sub-band to be raised slowly or quickly to its maximum level for any particular sound.

The apparatus by means of which the keyboard of Fig. 32 controls the energy level in each sub-band is disclosed more fully in Figs. 33 and 34. Each key lever 112 of the keyboard comprises a long strip of metal pivoted on a stationary rod 114 and each key lever is biased to its upper position by a leaf spring 115. Beneath the key levers are the ten movable bars 100 to 109, inclusive, supported for lateral movement in slots in two stationary supports 116 and 117 and each bar is biased by a spring 118 to a position to the right in Fig. 33 where a shoulder 119 on each bar strikes against stationary support 116.

Associated with the left end of each of the horizontal bars 100 to 109 is a vertically arranged lever 120, the upper end of which comprises a flexible sliding contact arm 121 for one of the potentiometer resistances. These vertical levers 120 are pivoted on a horizontal rod 122 and by means of springs 123 are biased to maintain the lower ends of these vertical levers always in contact with the left ends of the horizontal bars 100 to 109. The arrangement is such that in the normal position of the apparatus with shoulders 119 against support 116 all of the spring contacts 121 for the potentiometers are in a position to give zero output.

Each key lever 112 passes across the horizontal bars over a section of each bar individual to the particular key lever. Beneath each key lever is located a slot in each bar of such a configuration that when depressed, the key lever strikes a sloping side wall of the slot in such a manner as to produce the desired lateral movement to the left of each horizontal bar, it being intended that each key lever will be depressed until it strikes the bottom of the slot.

Fig. 34 is a diagrammatic showing of portions of the slidable bars 100 to 109 showing the character of the slots beneath those five key levers marked with the phonetic symbols $t$, $\check{e}$, $s$, $u$ and $p$. Each key lever is shown in cross-section just above each slidable bar, indicating that there is normally no contact between the key lever and the horizontal bars. The lower edge of each key lever is shown at points marked 124 and is shown rounded to reduce friction. Each key lever may be of a uniform height throughout its length although for the sake of reducing the space required for Fig. 34 the cross-section of each key lever is shown of reduced height except at the top of the figure.

It will be recalled that from Fig. 32 horizontal bar 100 controls the energy level in the sub-band of 0 to 225 cycles; bar 101 controls the band of 225 to 450 cycles; bar 102 controls the band from 450 to 700 cycles; bar 103 controls the band from 700 to 1000 cycles; bar 104 controls the band from 1000 to 1400 cycles; bar 105 controls the band from 1400 to 2000 cycles; bar 106 controls the band from 2000 to 2700 cycles; bar 107 controls the band from 2700 to 3800 cycles; bar 108 controls the band from 3800 to 5400 cycles; and bar 109 controls the band from 5400 to 7500 cycles.

Figure 34A:
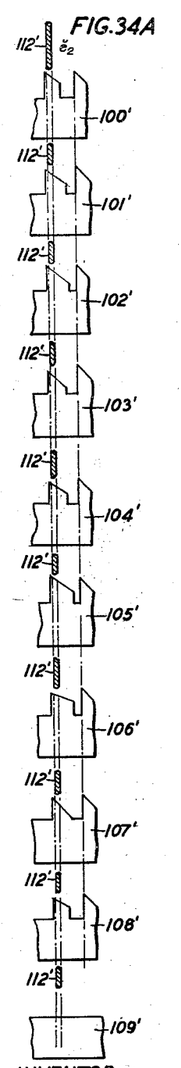
Figure 34B:
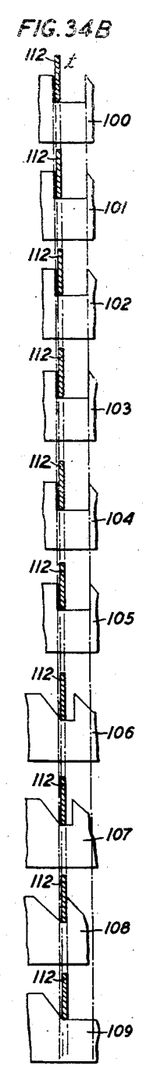

In considering the character of the horizontal bars beneath the key lever marked $t$ it will be noted that bars 100 to 105, inclusive, have wide slots with vertical side walls beneath key lever $t$ so that when key lever $t$ is fully depressed there will be no lateral movement imparted to bars 100 to 105, inclusive. Fig. 34—B shows key lever $t$ fully depressed and resting against the bottom of the slot in each horizontal bar. However, key $t$ when depressed will strike the sloping side wall 136 in bar 106, resulting in a substantial movement of bar 106, will strike the side wall 137 in slot 107 to cause a somewhat greater movement of bar 107 than for bar 106, will strike side wall 138 to move bar 108 a greater distance than bar 107, and will strike side wall 139 to cause bar 109 to be moved about the same distance as bar 107. In view of the earlier description of Figs. 32 and 33, it should be apparent that by the depression of key $t$ into the described slots in the horizontal bars 100 to 109, amplifier 110 will receive no energy in the first six sub-bands from zero cycles to 2000 cycles; the amplifier will receive substantial energy in the sub-band from 2000 to 2700 cycles due to the movement of bar 106; the amplifier will receive somewhat greater energy in the sub-band between 2700 and 3800 cycles due to the movement of bar 107; the amplifier will receive a still greater amount of energy in the sub-band 3800 to 5400 cycles due to the greater movement of bar 108; and will receive a smaller amount of energy in the band from 5400 to 7500 cycles due to the smaller movement of bar 109. Therefore, the depression of key lever $t$ results in amplifier 110 receiving frequencies from 2000 to 7500 at relative energy levels which will result in the artificial simulation of the sound $t$.

If we consider as another example the slots in the horizontal bars for the key lever marked $\check{e}_1$ (as in well), it will be noted that bars 100 to 108, inclusive, will be moved to the left varying amounts to produce the potentiometer settings required for the $e$ sound in well. Horizontal lever 109 will not be actuated since for the $\check{e}$ sound no energy is required in the sub-band from 5400 to 7500 cycles.

Considering in a similar manner the key marked $s$ in Fig. 34, it will be noted that the depression of key $s$ will maintain zero potentiometer settings for the potentiometers associated with bars 100 to 102, inclusive, but will result in varying amounts of energy being transmitted to amplifier 110 from those frequency sub-band channels controlled by bars 103 to 109.

With the slots cut in bars 100 to 109 in the manner shown in Fig. 34, it will be apparent that the maximum energy level for all channels will be reached at the same time. However, when the oscillograph records of the various sub-bands of a spoken word are examined it may be noted for some sounds that certain sub-bands reach their maximum level at an earlier time than for other sub-bands. Hence, in order to more accurately represent the spoken sounds it may be desirable to introduce a time element in the setting of potentiometers 90 to 99. The introduction of a varying time element in the potentiometer settings may be accomplished, for example, by cutting the slots in the manner shown in Fig. 34—A, which shows a typical cutting in the ten horizontal bars 100' to 109' for actuation by the key lever marked $\check{e}_2$, this key also being intended to represent the $e$ sound in well. The maximum amount of movement of each horizontal bar in Fig. 34—A is the same as in Fig. 34 for the corresponding channel, but the energy in the various channels is applied at different time intervals. Thus, it will be seen from Fig. 34—A that bar 105' will be the first one moved, followed in a short time interval by bar 106', followed in a short time interval by bars 100', 101', 102', and 104', followed later by bars 107' and 108' and followed still later by bar 103'. It will also be noted that certain sub-bands, such as the one controlled by bar 100', will reach their maximum energy level before the maximum energy is transmitted in other sub-bands, such as the sub-band controlled by bar 105'. It may be also noted that the rate at which the energy in any sub-band is applied can be determined by the steepness of the slope of the side wall slot contacted by the key lever when depressed. Bar 109' is not moved by the depression of key $\check{e}_2$.

Referring again to Fig. 33, it will be noted that the movement of any horizontal bar with respect to its effect upon the potentiometer setting will be amplified by the ratio between the lengths of the two arms of the pivoted members 120 so that a small movement of any horizontal bar means a larger movement in the sliding contact on the associated potentiometer. In practice, it has been found desirable to design the apparatus so that the depression of any key lever will give any one of twenty to twenty-five different values of energy level from any channel including no energy at the starting point.

Referring to Fig. 32, the amplifier 110 is shown in three stages with a switch 141 between the first and second stages to adjust the amplifier gain by relatively large steps in order that a sudden increase or decrease in loudness can be secured for given sounds. Between the second and third stages a potentiometer controlling switch 142 is provided to give a gradual increase or decrease in the loudness of any desired sound. As previously stated, the fundamental frequency of each voiced sound is controlled by the control switch 33 of relaxation oscillator 30. Switches 33, 141, 142 as well as the source determining switches 79 and 79' may be made a part of the keyboard 112 for operation by the fingers or they may be arranged for operation by the foot or some other part of the body.

If desired, the system of Fig. 32 may include a delay equalizer network 125 connected in circuit with the band-pass filters to compensate for any delay distortion present in the filters. It is also to be understood that, if desired, amplifier 110 may be connected over a long transmission line to the loud-speaker 113.

The subdivision of the speech frequency range into ten different frequency channels as shown in Fig. 32 will generally be found satisfactory for high quality artificial speech production but, if desired, the speech range may be divided into a smaller or larger number of channels with a different distribution of the frequency range between the channels, in accordance with the principles set forth in my copending application Serial No. 47,393, filed October 30, 1935.

The various equalizing networks required in the artificial speech producing system of Fig. 1 may be readily constructed in accordance with the general principles of network design disclosed, for example, in an article by Zobel in the Bell System Technical Journal for July 1928, vol. 7, No. 3, or as disclosed in one or more of the following United States patents: Stevenson 1,606,-817 of November 16, 1926; Zobel 1,603,305 of October 19, 1926; and Zobel 1,701,552 of February 12, 1929.

Figure 35:
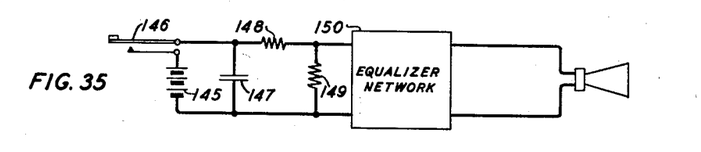
Fig. 35 represents an alternative type of circuit which may be employed for producing the unvoiced stop consonants.

Certain possible modifications of the apparatus of Fig. 1 will now be described. In Fig. 1 the continuous frequency spectrum source for the unvoiced stop consonants p, t and k comprises amplified resistance noise as modified by certain equalizing networks. In Fig. 35 an alternative source for these stop consonants is described. In Fig. 35 the source comprises a battery 145, the circuit for which is closed through a switch 146 to charge a condenser 147. The discharge of this condenser takes place through two resistances 148 and 149, one in series and one in shunt to control the rate of discharge and then through a selecting network 150 to give the desired energy distribution with frequency for the particular stop consonant to be simulated. The effect of the circuit of Fig. 35 is to produce a sudden click when the switch 146 is closed, which click, however, will have certain frequencies predominating in it due to the transmission characteristic of network 150 as given by curve 1, 2 or 3 of Figs. 3, 4, and 5.

Figure 36:
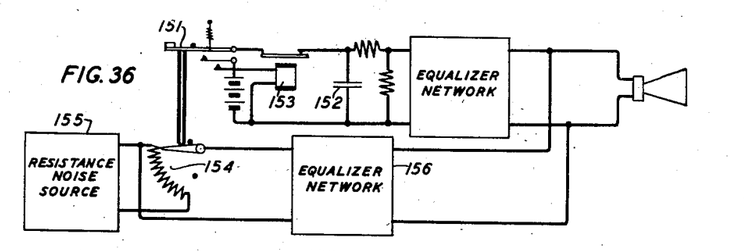
Fig. 36 is an alternative circuit which may be employed for producing special sounds such as the affricate consonant ch.

Fig. 36 is an arrangement which, if desired, may be embodied in the artificial speech producing system of Fig. 1, to produce the affricate consonant ch. An affricate consists essentially of a stop consonant followed by a fricative consonant. Accordingly, the circuit of Fig. 36 has two parts; the upper part for producing a stop consonant being similar to Fig. 35, while the lower part for producing the sustained fricative consists of a potentiometer arrangement for taking the desired amount of energy from a resistance noise source and feeding it through a selective circuit that will give a proper weighting to the different frequency components in the resistance noise. Both controls operate from a single push button 151. In depressing button 151 a circuit is closed for charging condenser 152 in the same manner as in Fig. 35, but immediately thereafter the energizing circuit for a relay 153 is closed which in pulling up its contact opens the condenser charging circuit. The purpose of the relay is to cut off the stop consonant circuit after the sudden click sound has been started. This relay 153 should operate very fast and will, of course, keep the charging circuit open until the push button is restored to normal and again depressed. Accordingly, the condenser 152 is charged and then is effectively removed from the circuit thereafter until such time as key 151, after being released, is pressed down again for a second production of the desired sound. A third operation resulting from depressing key 151 is to vary the adjustment of potentiometer 154 to supply a desired amount of energy from the resistance noise source 155 through a selective network 156 to the loud-speaker circuit.

Figure 37:
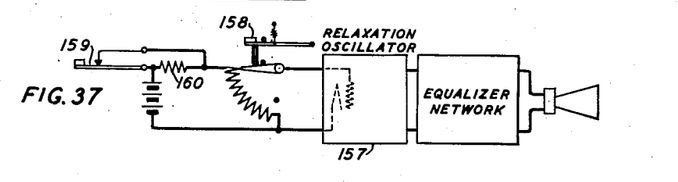
Fig. 37 represents an alternative arrangement for controlling the frequency of the fundamental frequency of the discrete frequency spectrum source.

Fig. 37 illustrates another modification that may be made in the artificial speech producing system of Fig. 1 or Fig. 32 to provide therein an arrangement for producing a sudden pitch drop. It has been found from examination of a number of oscillograms that the voiced stop consonants b, d and hard g have a pitch about 15 per cent lower on the average than do the succeeding vowel sounds when words are formed. In Fig. 37 the fundamental frequency of the relaxation oscillator 157 is normally obtained by a proper setting of potentiometer switch 158. But when a sudden drop in pitch is desired as above noted, key 159 may be operated to remove the short circuit around resistance 160, thereby producing a momentary reduction in the fundamental frequency of the oscillator connected to the equalizer networks of Fig. 1.

Figures 38, 38A, 38B, 38C, 38D, 38E:
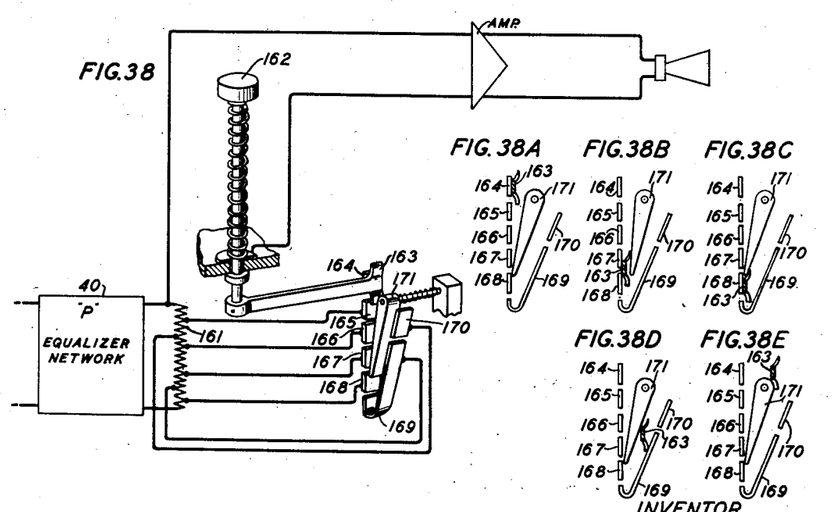

In Fig. 1 the keys 40' to 71' are shown as of a relatively simple type for quickly establishing or disconnecting the connections between one of the selective networks and the loud-speaker circuit but in producing certain sounds artificially it may be desirable to apply the electrical energy from the equalizer network by gradual increments until a maximum is reached, after which the energy level is gradually decreased to zero, possibly at a different rate than the rate at which it was increased. Fig. 38 discloses a type of key which may be employed for this apparatus as a substitute for the key 40' in Fig. 1 which serves to connect the selective network 40 to the loud-speaker circuit. Connected across the output terminals of the selective network 40 is a potentiometer resistance 161, and key 162 when actuated serves to impress upon the loud-speaker circuit varying amounts of the energy output of network 40. Adjacent the free end of spring contact member 163 of key 162 are a plurality of conductive bars 165 to 170 connected as shown to different points on resistance 161, but in the normal position of the key, member 163 is biased to rest against a stop 164 not associated with the potentiometer, so that the key normally makes no connection between network 40 and the amplifier loud-speaker circuit. The normal key position is shown in Fig. 38—A. However, when the key 162 is depressed the spring end 163 passes downwardly between bars 165 to 168 and a pivoted pawl which is spring biased against bar 168 as shown in Fig. 38—A. During this downward movement spring 163 successively contacts bars 165, 166, 167, and 168, as shown in Fig. 38—B, thereby supplying increasing amounts of the network output to the amplifier circuit. When spring member 163 has reached the lower end of its path beyond the lower end of pawl 171, the pawl resumes its biased position against bar 168, as shown in Fig. 38—C, thereby causing spring member 163 in its return to normal to travel between pawl 171 and bars 169 and 170, as shown in Fig. 38—D, thereby contacting bars 169 and 170 successively, after which member 163, as shown in Fig. 38—E, rides over the upper end of pawl 171 and returns to its position of Fig. 38—A. Pawl 171 is preferably made of insulating material. Therefore, in the downward movement of key 162 the energy from selective circuit 40 is increased to a maximum value in four successive steps while in returning the key to normal the energy level is decreased to zero in three successive steps. It is obvious that by the use of such a keying arrangement the energy level from a given equalizer network of Fig. 1 may be made effective either suddenly or in graduated steps, and after reaching a maximum value may be reduced to zero level either slowly or quickly, as desired.

Figure 39:
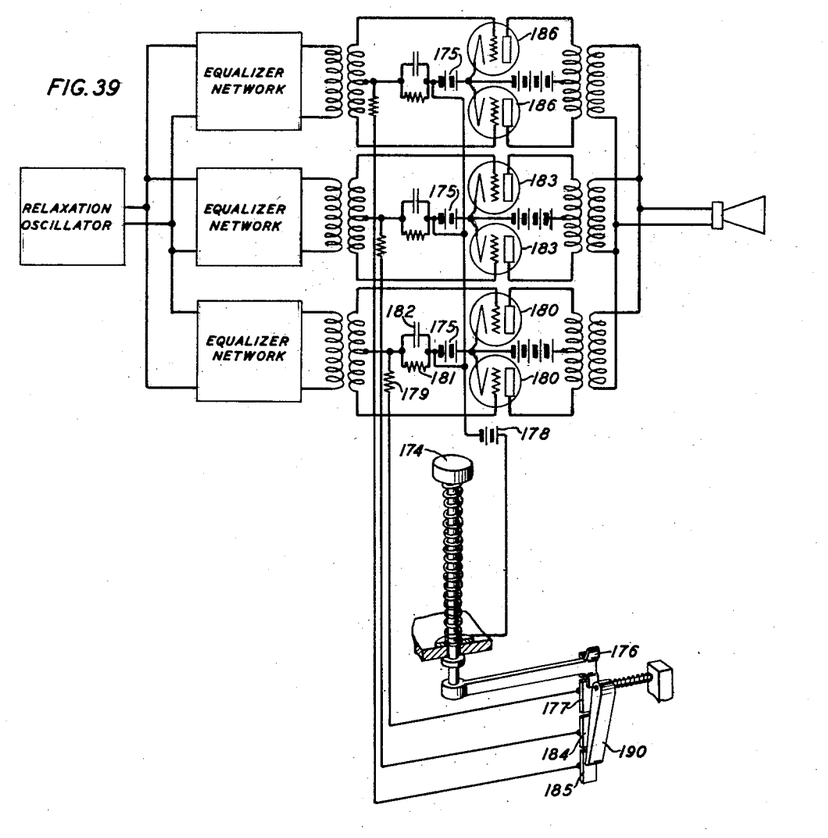
Fig. 39 illustrates a circuit modification of Fig. 1 for throwing on three different sounds in succession by the operation of one keying arrangement.

Fig. 39 shows a circuit for throwing on three different sounds in succession and fading them in and out at desired rates and, therefore, represents a possible addition to Fig. 1 as a special means for producing three successive sounds by one keying operation. The arrangement of Fig. 39 may be found useful in the formation of diphthongs or triphthongs or even more complicated sounds. The circuit of Fig. 39 is divided into three channels, each channel being adapted to produce a different sound determined by the transmission characteristics of the selective network in each channel. Each of the channels from the relaxation oscillator includes at the output terminals of the equalizer network an amplifier which is normally inoperative due to battery 175 maintaining the grid electrodes at a sufficiently negative potential to produce this result. When switch contact 176 (similar to the keying arrangement of Fig. 38) is depressed by key 174 it first makes contact with a conductive segment 177 to connect battery 178 through a series resistance 179 in such a manner as to make the grids less negative and to permit the amplified transmission through amplifier 180 of the tone determining output from the associated selective network. The rate at which the tone level builds up to a maximum value depends primarily upon the value of resistance 179 while the rate at which the tone level decreases to zero after switch contact 176 has moved beyond conducting segment 177 depends primarily upon the value of resistance 181 in shunt to condenser 182. While two separate resistances 179 and 181 are shown, one for build-up and one for discharge of the same condenser, it will be apparent that the circuit can be increased in complexity to get any desired rate of build-up and decay for the biasing voltage from battery 178.

The key contact 176 next passes to the conductive segment 184 and renders amplifier 183 operative in the manner described above to transmit the tone determining currents from the associated selective circuit in a manner similar to that described for amplifier 180. Subsequently, the key contact 176 passes down to conductive segment 185 to render amplifier 186 operative to transmit to the loud-speaker circuit the tone determining currents from the selective circuit associated with amplifier 186. After leaving conductive segment 185, key contact 176, due to cam 190, returns to its normal position without contacting with segments 177 and 184, as explained in connection with Fig. 38. The operation of key 174, therefore, enables three tones to be produced in rapid succession by the actuation of a single key lever and it will be obvious that by proper design of the key contacting arrangements any amount of blending together of the three sounds may be obtained as by choosing the size of the conductive segments 177, 184 and 185 with respect to the size of the moving contact 176, so that, for example, the first tone from amplifier 180 will be transmitted at the same time as the second tone from amplifier 183 is building up to its maximum value.

The arrangements described above are intended to illustrate the principles underlying the present invention which may possess still other embodiments commensurate with the scope of the invention as defined in the appended claims.

What is claimed is:

1. Mechanism for producing phonetic sounds represented by a complex wave, comprising means for producing a discrete frequency pattern corresponding to the frequency distribution of certain of said sounds, means for producing a continuous frequency pattern corresponding to the frequency distribution of other of said sounds, a plurality of manually operable members and means individual to each member and controlled by its member for establishing a relative amplitude level for the various frequencies of one of said patterns over the frequency range required to define one of the phonetic sounds to be produced, each of said individual means defining the variable characteristics of a different phonetic sound.

2. In a mechanism for producing phonetic sounds represented by a complex wave, means for producing a discrete frequency pattern corresponding to the frequency distribution of certain of said sounds, means for producing a continuous frequency pattern corresponding to the frequency distribution of other of said sounds, a keyboard having a manually operated key individual to each phonetic sound to be produced, and means individual to each key and controlled by its key for establishing a relative amplitude level for the various frequencies of one of said patterns over the frequency range required to define one of the phonetic sounds to be produced, each of said individual means defining the variable characteristics of a different phonetic sound.

3. In a mechanism for producing phonetic sounds represented by a complex wave, a source of electric waves having a discrete frequency spectrum representing the frequency distribution of certain of said sounds, a source of electric waves having a continuous frequency spectrum representing the frequency distribution of other of said sounds, a plurality of selective networks each having an amplitude versus frequency transmission characteristic defining the energy distribution with frequency of a different one of the phonetic sounds to be produced, a loud-speaker and means for successively connecting said networks between one of said sources and said loud-speaker in any desired order.

4. In a mechanism for producing vocal and other sounds represented by a complex wave, a source of electric waves having a discrete frequency spectrum representing the frequency distribution of certain of said sounds, a source of electric waves having a continuous frequency spectrum representing the frequency distribution of other of said sounds, a plurality of channels adapted to be connected to either of said sources, a band-pass filter in each channel whereby each channel selectively transmits a different band of speech frequencies, movable members one for each channel adapted to be moved to any one of a plurality of positions, means individual to each channel and controlled by one of said members for controlling the energy level in its respective channel, a keyboard comprising a plurality of keys, each key selectively controlling the movement of a plurality of said members, and means common to all of said channels for converting the transmitted electric waves into sound waves.

5. In a mechanism for producing vocal and other sounds represented by a complex wave, a source of electric waves having a discrete frequency spectrum representing the frequency distribution of certain of said sounds, a source of electric waves having a continuous frequency spectrum representing the frequency distribution of other of said sounds, a plurality of channels adapted to be connected to either of said sources, a band-pass filter in each channel whereby each channel selectively transmits a different band of speech frequencies, a plurality of movable members one for each channel and adapted to assume any one of a plurality of positions, a keyboard comprising a plurality of manually operated keys, each key when operated causing each of said members to be selectively actuated to a definite predetermined position, means for determining the energy level in each channel in accordance with the movement of one of said members, and means responsive to the energy level in all of said channels for converting the transmitted electric waves into sound waves.

6. In a mechanism for producing vocal and other sounds represented by a complex wave, a source of electric waves having a discrete frequency spectrum representing the frequency distribution of certain of said sounds, a source of electric waves having a continuous frequency spectrum representing the frequency distribution of other of said sounds, a plurality of channels adapted to be connected to either of said sources, a band-pass filter in each channel whereby each channel selectively transmits a different band of speech frequencies, a plurality of slotted members one for each channel and adapted to be moved longitudinally, said members lying substantially in the same plane, a plurality of key levers, each key lever when operated entering slots in said members to cause the selective movement of said members, means for determining the energy level in each channel in accordance with the movement of one of said members, and means responsive to the energy level in all of said channels for converting the transmitted electric waves into sound waves.

7. In a mechanism for producing vocal or other sounds represented by a complex wave, a source of electric waves having a discrete frequency spectrum, a source of electric waves having a continuous frequency spectrum, a plurality of channels adapted to be connected to either of said sources, a band-pass filter in each channel whereby each channel selectively transmits a different band of speech frequencies, a plurality of movable members one for each channel, an adjustable potentiometer in each channel controlled by one of said members, a plurality of key levers mounted adjacent said members, each key lever representing a different sound to be produced, each of said members having a slot for receiving a portion of each of said levers, each of said slots having such a configuration as to cause a predetermined movement of certain of said members when any one of the levers is operated to enter said slots, and means responsive to the energy level in all of said channels for converting the transmitted electric waves into sound waves.

8. In a mechanism for producing vocal or other sounds represented by a complex wave, a source of electric waves having a discrete frequency spectrum, a source of electric waves having a continuous frequency spectrum, a plurality of channels adapted to be connected to either of said sources, a band-pass filter in each channel whereby each channel selectively transmits a different band of speech frequencies, a plurality of movable members one for each channel, each of said members being biased to a normal position, means controlled by the movement of each of said members for controlling the energy level in the channel associated with each member, a plurality of manually operated key levers mounted adjacent said members, each lever representing a different sound to be produced, each of said members having a slot for receiving a portion of each of said levers when said levers are operated, each lever when operated contacting with the side walls of certain of said slots to produce movements of certain of said members, the side walls of slots individual to one lever having such a configuration that an operated lever completes the movement of one member from its normal position prior to the completion of the movement of another member from its normal position.

9. In a mechanism for producing vocal or other sounds represented by a complex wave, a source of electric waves having a discrete frequency spectrum, a source of electric waves having a continuous frequency spectrum, a plurality of channels adapted to be connected to either of said sources, a band-pass filter in each channel whereby each channel selectively transmits a different band of speech frequencies, a plurality of movable members one for each channel, each of said members being biased to a normal position, means controlled by the movement of each of said members for controlling the energy level in the channel associated with each member, a plurality of manually operated key levers mounted adjacent said members, each lever representing a different sound to be produced, each of said members having a slot for receiving a portion of each of said levers when said levers are operated, each lever when operated contacting with the side walls of certain of said slots to produce movements of certain of said members, the side walls of slots individual to one lever having such a configuration that an operated lever initiates the movement of one of said members from its normal position prior to causing the movement of another member from its normal position.

10. In a mechanism for producing vocal and other sounds represented by a complex wave, a multifrequency source having a frequency pattern corresponding to the frequency distribution of certain of said sounds, means for modifying the output of said source to establish a relative amplitude level for the various frequencies from said source to simulate the energy distribution of a desired sound to be produced, a loud-speaker, a manually operable member biased to a normal position, a cam movable with said member, means for causing said cam to travel along one path during the movement of said member to an advanced position and to travel along a different path during the restoration of said member to normal position, spaced contacts contacted by said cam during its travel along said one path, spaced contacts contacted by said cam during its travel along said different path, and a potentiometer resistance for controlling the amount of energy from said source received by said loud-speaker, said contacts being connected to different points on said resistance.

11. In a mechanism for producing phonetic sounds represented by a complex wave, a source of electric waves having a discrete frequency spectrum representing the frequency distribution of certain of said sounds, a source of electric waves having a continuous frequency spectrum representing the frequency distribution of other of said sounds, a plurality of selective networks each having an amplitude versus frequency transmission characteristic defining the energy distribution with frequency of a different one of the phonetic sounds to be produced, certain of said networks being connected to the output of said discrete frequency spectrum source, other of said networks being connected to the output of said continuous frequency spectrum source, still other of said networks being connected to the output of both of said sources, a loud-speaker and means for connecting said networks to said loud-speaker one at a time in any desired sequence.

12. In a mechanism for producing vocal and other sounds represented by a complex wave, a source of electric waves having a discrete speech frequency spectrum, a source of electric waves having a continuous speech frequency spectrum, a plurality of channels adapted to be connected to either of said sources, a band-pass filter in each channel whereby each channel selectively transmits a different band of speech frequencies, a keyboard comprising a plurality of manually operated key levers, each lever representing a different sound to be produced, means individual to each lever and effective upon the operation of a lever for controlling the energy level in each channel, said means giving substantially zero transmission in each channel when no lever is operated, said means when one lever is operated raising the energy level in one channel to its maximum value for the operation of said one lever prior to the time the energy level in another channel is raised to its maximum value for said lever.

13. In a mechanism for producing vocal and other sounds represented by a complex wave, a source of electric waves having a discrete speech frequency spectrum, a source of electric waves having a continuous speech frequency spectrum, a plurality of channels adapted to be connected to either of said sources, a band-pass filter in each channel whereby each channel selectively transmits a different band of speech frequencies, a keyboard comprising a plurality of manually operated key levers, each lever representing a different sound to be produced, means individual to each lever and effective upon the operation of a lever for controlling the energy level in each channel, said means giving substantially zero energy in each channel when no lever is operated, said means when one lever is operated causing the energy level in one channel to increase prior to the time that the transmission level in another channel is increased from its normal zero energy condition.

14. In a mechanism for producing vocal and other sounds represented by a complex wave, a source of electric waves having a discrete frequency spectrum, a source of electric waves having a continuous frequency spectrum, a plurality of channels adapted to be connected to either of said sources, a band-pass filter in each channel whereby each channel selectively transmits a different band of speech frequencies, an output circuit common to all of said channels, an adjustable potentiometer in each channel for controlling the amount of energy from each channel transmitted to said output circuit, means for preventing the adjustment of a potentiometer of one channel from adversely affecting the desired output from another of said channels, a keyboard comprising a plurality of manually operated key levers one for each sound to be produced, and means individual to each lever for controlling the adjustment of all of said potentiometers.

15. A mechanism for producing vocal or other sounds represented by a complex wave, comprising a condenser, means for charging and discharging said condenser, and means for controlling the relative amplitudes of the various frequencies effected by the discharging of said condenser to correspond to the amplitude pattern of the wave to be produced.

16. A mechanism for producing vocal or other sounds represented by a complex wave, comprising a condenser, means for charging and discharging said condenser, means for controlling the discharging rate of said condenser, and means for controlling the relative energy levels of the frequencies in the band of frequencies generated by the discharging of said condenser to define the wave pattern to be produced.

17. A mechanism for producing vocal or other sounds represented by a complex wave, comprising a condenser, means for charging and discharging said condenser, a source of electric waves having a continuous frequency spectrum, means operably associated with the charging and discharging means to adjust said source to supply a predetermined amount of continuous frequency energy, and means for controlling the relative amplitudes of the various frequencies effected by the discharging of the condenser and supplied by the source to correspond to the amplitude pattern of the wave to be produced.

18. A mechanism for producing vocal or other sounds represented by a complex wave, comprising a condenser, means for charging said condenser, electro-magnetic means responsive to the charging means for interrupting the charging of said condenser and allowing the discharge thereof, means for controlling the discharge rate of said condenser, a source of electric waves having a continuous frequency spectrum, a potentiometer connected to said source and adjusted by said charging means to supply a certain amount of continuous frequency energy, and means for controlling the relative energy levels of the frequencies in the bands of frequencies generated by the discharging of said condenser and supplied by said source to define the wave pattern to be produced.

HOMER W. DUDLEY.